(12) United States Patent
Hwang

(10) Patent No.: US 7,591,360 B2
(45) Date of Patent: Sep. 22, 2009

(54) CLUTCH ASSEMBLY

(75) Inventor: Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 394 days.

(21) Appl. No.: 11/507,911

(22) Filed: Aug. 21, 2006

(65) Prior Publication Data

US 2007/0125618 A1   Jun. 7, 2007

(30) Foreign Application Priority Data

Dec. 2, 2005   (KR) .................. 10-2005-0117089

(51) Int. Cl.
 *F16J 15/10* (2006.01)
 *F16D 13/58* (2006.01)
(52) U.S. Cl. ............... 192/112; 192/30 R; 277/637; 277/910
(58) Field of Classification Search ............. 192/112; 277/354
See application file for complete search history.

(56) References Cited

U.S. PATENT DOCUMENTS

| 2,642,970 | A | * | 6/1953 | Szekely ................ 192/112 |
| 3,198,305 | A | * | 8/1965 | Marland et al. ........ 192/112 |
| 3,606,357 | A | * | 9/1971 | Yonkers .............. 277/637 |
| 6,595,372 | B1 | * | 7/2003 | Minowa et al. ........ 277/918 |
| 2004/0112699 | A1 | * | 6/2004 | Prater et al. ........ 192/3.28 |

FOREIGN PATENT DOCUMENTS

KR     1020040042926      5/2004

* cited by examiner

*Primary Examiner*—Rodney H Bonck
(74) *Attorney, Agent, or Firm*—Morgan, Lewis & Bockius LLP

(57) ABSTRACT

A clutch assembly includes a clutch, a clutch housing containing the clutch, and a clutch cover attached to the clutch housing, wherein first screw threads are formed on an outer side of the clutch cover, second screw threads corresponding to the first screw threads are formed on an inner side of the clutch housing, and the clutch cover is attached to the clutch housing by threading the first screw threads with the second screw threads.

1 Claim, 2 Drawing Sheets

CLUTCH ASSEMBLY

CROSS-REFERENCE TO RELATED APPLICATION

This application claims priority to and the benefit of Korean Patent Application No. 10-2005-0117089 filed in the Korean Intellectual Property Office on Dec. 2, 2005, the entire contents of which are incorporated herein by reference.

BACKGROUND OF THE INVENTION (a) Field of the Invention

The present invention relates to a clutch assembly. More particularly, the present invention relates to a clutch assembly that includes a clutch housing and a clutch cover connected therewith by screw threads to improve assembly.

(b) Description of the Related Art

A typical clutch assembly consists of a double clutch module directly connected with a flywheel of an engine, a clutch housing containing the double clutch module, and a clutch cover with an internal surface that contacts a rotating clutch hub and an external surface that contacts and is fixed to the clutch housing.

In a wet-type clutch, for example, a typical double clutch, oil is used for lubrication and cooling of the clutch during operation. The clutch cover prevents leakage of the oil from the clutch housing to prevent contamination of the engine by transmission oil.

An inner side of a conventional clutch cover has a lip seal structure for sealing a rotating body, and an outer side of the clutch cover coated with a rubber seal is pressed in and fixedly connected to the clutch housing thereinside.

Since the clutch cover has a larger diameter than the clutch housing, it is placed under extremely high pressure to be inserted into the clutch housing. Accordingly, ease of assembly is deteriorated.

In addition, maintaining balance of the clutch cover is difficult during the insertion of the clutch cover, and thus the clutch cover may interfere with a portion of the clutch during assembly. Furthermore, a rubber seal coating may be damaged when the clutch cover loses balance during insertion.

In addition, when the clutch is disassembled for service or inspection, the clutch cover has to be removed. However, it is difficult to reuse the clutch cover because it may be easily damaged during disassembly.

The above information disclosed in this Background section is only for enhancement of understanding of the background of the invention and therefore it may contain information that does not form the prior art that is already known in this country to a person of ordinary skill in the art.

SUMMARY OF THE INVENTION

A clutch assembly according to an exemplary embodiment of the present invention includes a clutch, a clutch housing containing the clutch, and a clutch cover attached to the clutch housing. First screw threads are formed on an outer side of the clutch cover, second screw threads corresponding to the first screw threads are formed on an inner side of the clutch housing, and the clutch cover is attached to the clutch housing by threading the first screw threads to the second screw threads.

The outer side of the clutch cover may include a first protrusion extending perpendicularly from the surface of the clutch cover and a second protrusion extending perpendicularly from the first protrusion, such that the clutch cover may have a generally stepped cross-section. The first screw threads may be formed on the second protrusion.

The inner side of the clutch housing may have a stepped shape including a vertical surface, and the first protrusion may include an extended portion that is parallel to the vertical surface and extends beyond the second protrusion. An O-ring may be disposed between the vertical surface and the extended portion.

The inner side of the clutch housing may have a snap ring groove, and a snap ring may be installed in the snap ring groove so as to contact the extended portion.

The surface of the first screw threads may have an elastic portion.

DETAILED DESCRIPTION OF THE PREFERRED EMBODIMENTS

An exemplary embodiment of the present invention will hereinafter be described in detail with reference to the accompanying drawings.

Figure 1:
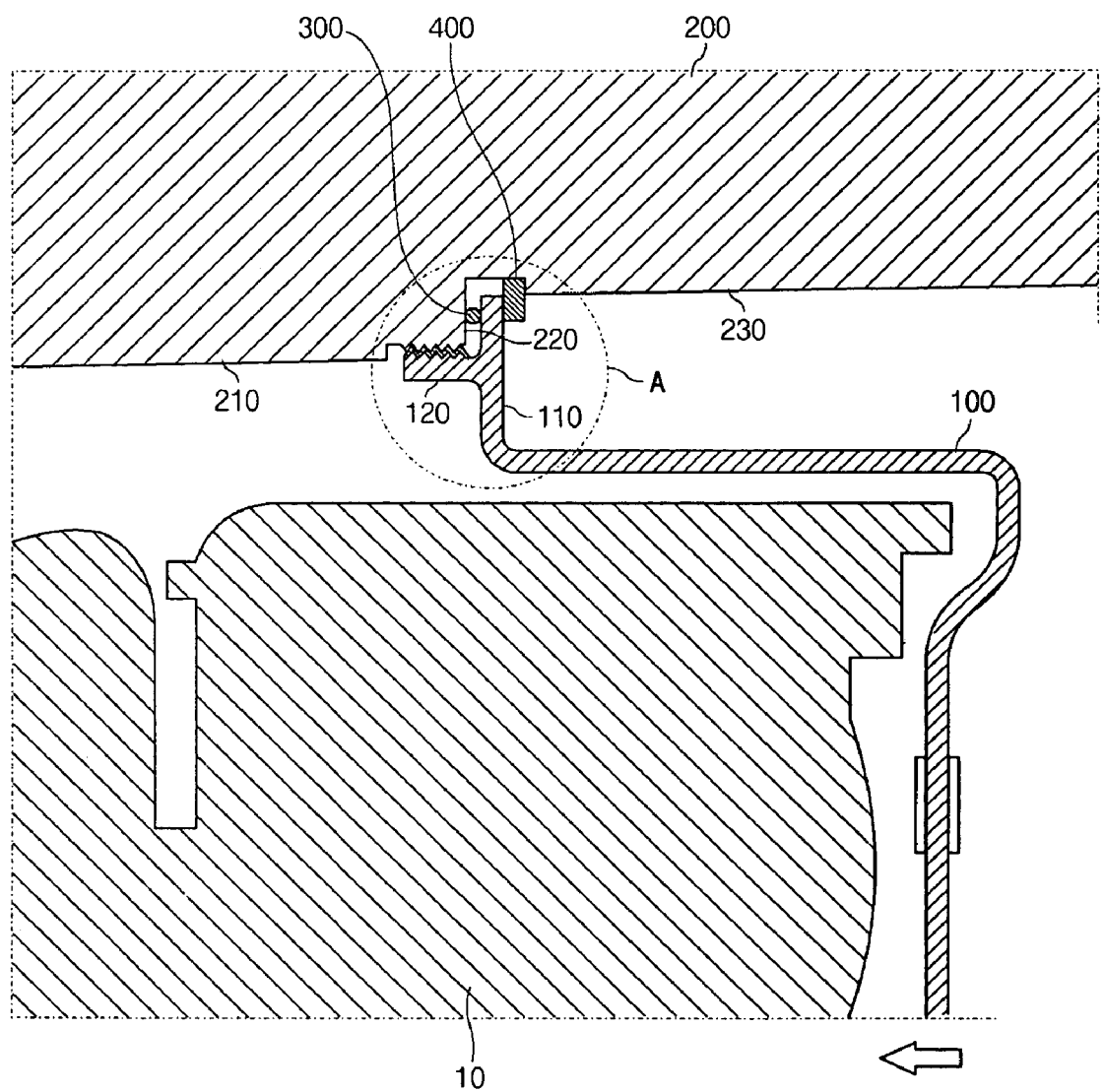
FIG. 1 is a schematic cross-sectional view showing a clutch assembly according to an exemplary embodiment of the present invention.
Figure 2:
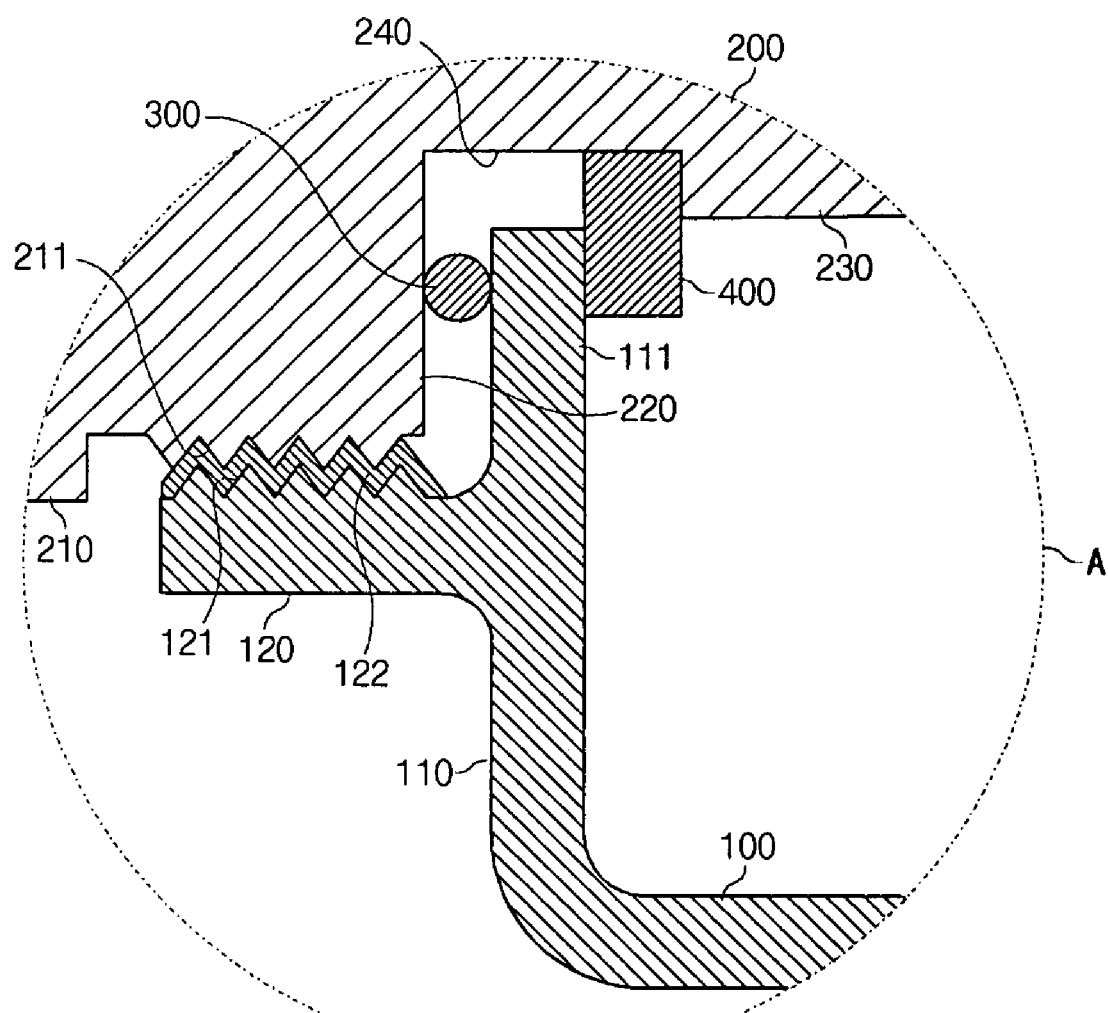
FIG. 2 is an enlarged cross-sectional view of a portion A where a clutch cover and a clutch housing engage with each other.

Referring to FIG. 1 and FIG. 2, a first protrusion 110 extends perpendicularly from the surface of the clutch cover 100 and a second protrusion 120 extends perpendicularly from the first protrusion 110. An outer side of the clutch cover 100 thus has a generally stepped cross-section in which a diameter of the clutch cover 100 is larger at the second protrusion 120 than at the remainder of the clutch cover 100. The clutch cover 100 encloses the clutch 10.

First screw threads 121 are formed on the second protrusion 120 for connection with the clutch housing 200. An elastic portion 122 may be formed on an exterior side of the first screw threads 121, for example by coating an elastic element, such as rubber, thereon.

Additionally, as shown in FIG. 1 and FIG. 2, the first protrusion 110 may extend beyond the second protrusion 120 to define an extended portion 111.

An inner side of the clutch housing 200 may also form a stepped portion. In more detail, the clutch housing 200 may include a first, smaller diameter internal surface 210; a second, larger diameter internal surface 230; and a vertical surface 220 connecting the two internal surfaces 210 and 230.

Second screw threads 211 may be formed on the first internal surface 210 corresponding to the first screw threads 121.

In addition, a snap ring groove 240 may be formed on the second internal surface 230 near the vertical surface 220.

To attach the clutch housing 200 to the clutch cover 100, an O-ring 300 is placed between the first protrusion 110 and the vertical surface 220 of the clutch housing, and then the clutch cover 100 is rotated. Since the clutch clover 100 and the clutch housing 200 are screw-coupled by the first and second screw threads 121 and 211, as the clutch cover 100 rotates, it advances in the direction of the arrow in FIG. 1.

A snap ring 400 is then installed in the snap ring groove 240 such that it contacts the outer side of the extended first protrusion 111 and securely attaches the clutch cover.

The screw-threading assembly of the present invention has the advantages of being assembled more easily than a conventional clutch assembly that is forcedly assembled, and therefore productivity is enhanced. Prevention of oil leakage is enhanced by the O-ring 300, which may be easily installed during the clutch assembly. Elastic portion 122 further prevents oil leakage.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A clutch assembly, comprising:
a clutch;
a clutch cover comprising first screw threads on a side thereof; and
a clutch housing containing the clutch and attached to the clutch cover, wherein said clutch housing comprises second screw threads corresponding to the first screw threads on a side of the clutch housing facing said side of said clutch cover;
wherein the clutch cover is attached to the clutch housing by threading the first screw threads with the second screw threads;
wherein the side of the clutch cover comprises a first protrusion, at least approximately perpendicular to a surface of said clutch cover, and a second protrusion extending at least approximately perpendicularly from the first protrusion, such that the clutch cover has a generally stepped cross-section, wherein the first screw threads are disposed on the second protrusion;
wherein the side of the clutch housing comprises a step including a vertical surface,
the first protrusion comprises an extended portion that is at least approximately parallel to the vertical surface and extends beyond the second protrusion, and an O-ring is disposed between the vertical surface and the extended portion;
wherein a snap ring groove is disposed on the side of the clutch housing, a snap ring is installed in the snap ring groove so as to contact the extended portion; and
wherein at least one of the first and second screw threads comprises an elastic portion.

* * * * *